(12) United States Patent
Schaller et al.

(10) Patent No.: US 11,255,824 B2
(45) Date of Patent: Feb. 22, 2022

(54) PHOTOACOUSTIC SENSOR MODULE AND ASSEMBLY

(71) Applicant: Infineon Technologies AG, Neubiberg (DE)

(72) Inventors: Rainer Markus Schaller, Saal (DE); Horst Theuss, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 659 days.

(21) Appl. No.: 16/184,412

(22) Filed: Nov. 8, 2018

(65) Prior Publication Data

US 2020/0150095 A1 May 14, 2020

(51) Int. Cl.
*G01N 29/02* (2006.01)
*G01N 29/24* (2006.01)

(52) U.S. Cl.
CPC ......... *G01N 29/2425* (2013.01); *G01N 29/02* (2013.01); *G01N 2291/021* (2013.01)

(58) Field of Classification Search
CPC ............... G01N 29/2425; G01N 29/02; G01N 2291/021
See application file for complete search history.

(56) References Cited

U.S. PATENT DOCUMENTS

| | | | | |
|---|---|---|---|---|
| 10,996,201 | B2 * | 5/2021 | Eberl | G01J 1/42 |
| 2006/0126070 | A1 * | 6/2006 | Kauppinen | G01N 21/1702 |
| | | | | 356/432 |
| 2012/0000271 | A1 * | 1/2012 | Fritz | G01N 29/2425 |
| | | | | 73/24.02 |
| 2012/0103065 | A1 * | 5/2012 | Muehleisen | G01J 3/18 |
| | | | | 73/24.02 |
| 2015/0101395 | A1 * | 4/2015 | Dehe | G01N 29/2425 |
| | | | | 73/24.02 |
| 2016/0313288 | A1 * | 10/2016 | Theuss | G01N 29/032 |
| 2020/0400544 | A1 * | 12/2020 | Etschmaier | H05K 1/0274 |

OTHER PUBLICATIONS

Schott North America, Inc., "TO Caps & Lenses", https://www.us.schott.com/epackaging/english/opto/to_caps/index.html?wss_setorigin=1&wss_iso=en-US, Mar. 20, 2015, 3 pages.
Schott North America, Inc., "TO Headers", https://www.us.schott.com/epackaging/english/opto/to_headers.html?wss_setorigin=1&wss_iso=en-US, Feb. 20, 2008. 4 pages.
Boston Electronics Corporation, "Products", https://www.boselec.com/products/, 2018, 6 pages.

* cited by examiner

*Primary Examiner* — Jamel E Williams
(74) *Attorney, Agent, or Firm* — Harrity & Harrity, LLP (57) ABSTRACT

The present disclosure is related to a photoacoustic sensor modular assembly. An example interconnect module includes a support structure configured to be situated between an emitter module of the photoacoustic sensor and a detector module of the photoacoustic sensor. The emitter module may include an emitter component and the detector module may include a detector component. The interconnect module may include a conductive element configured to connect to at least one of the emitter component or the detector component.

20 Claims, 7 Drawing Sheets

PHOTOACOUSTIC SENSOR MODULE AND ASSEMBLY

BACKGROUND

A photoacoustic sensor may be used in a variety of applications. A photoacoustic sensor includes an emitter component and a detector component. The emitter component emits light pulses that are absorbed by a substance (e.g., a gas, a liquid, a solid material, and/or the like). The absorbed light pulses generate corresponding pressure pulses which produce a corresponding acoustic signal that can be detected by the detector component. The emitter component modulates the light pulses at a particular frequency to target particular molecules and the detector component senses one or more properties of the molecules based on the acoustic signals received from the targeted molecules absorbing the light pulses.

SUMMARY

According to some implementations, an interconnect module may include a support structure configured to be situated between an emitter module of a photoacoustic sensor and a detector module of the photoacoustic sensor, wherein the emitter module may include an emitter component and the detector module may include a detector component; and a conductive element configured to connect to at least one of the emitter component or the detector component.

According to some implementations, a photoacoustic sensor may include an emitter module, wherein the emitter module includes an emitter component configured to emit light pulses; a detector module, wherein the detector module includes a detector component configured to detect absorption of the light pulses by a gas; and an interconnect module positioned between the emitter module and the detector module, wherein the interconnect module comprises a support structure connecting the emitter module and the detector module, wherein the support structure includes a conductive element to provide electrical connectivity to the emitter component or the detector component, and wherein the support structure includes a cavity to enable the gas to flow within the interconnect module.

According to some implementations, a method may include attaching an interconnect module to a detector module, wherein the detector module includes a detector component and the interconnect module includes a first conductive element configured to bond with the detector component; and attaching an emitter module to the interconnect module opposite the detector module, wherein the emitter module includes an emitter component, wherein the interconnect module includes a second conductive element configured to bond with the emitter component, and wherein the interconnect module forms a cavity between the emitter module and the interconnect module.

DETAILED DESCRIPTION

The following detailed description of example implementations refers to the accompanying drawings. The same reference numbers in different drawings may identify the same or similar elements.

In some instances, a photoacoustic sensor is assembled from several components and/or modules that are created and/or manufactured separately from one another. For example, an emitter module may be fabricated with an emitter component separately from detector module that has a detector component. A photoacoustic sensor (e.g., a photoacoustic gas sensor) may be configured with a directionally arranged configuration that includes an emitter module and a detector module to generate an absorption path (e.g., a route through which gas may flow) between the emitter component (e.g., one or more elements that emit light) and the detector component (e.g., one or more elements that detect light absorption), such that the emitter component is configured to emit light pulses through the absorption path toward the detector component.

Previous techniques of assembling such a photoacoustic sensor are especially complex when the photoacoustic sensor is relatively small in size (e.g., having a length, width, and/or height of less than 20 (mm)). Some previous techniques involve attaching an emitter module (which includes an emitter component) to a detector module (which includes a detector component). However, the material (ceramic) used for emitter modules and detector modules in those techniques is not structurally sound enough to provide an adequate absorption path (e.g., ceramic components are too fragile to be mounted together in a manner that creates a relatively large absorption path). Furthermore, the absorption path in those techniques is limited to the size of the modules, therefore not providing flexibility with respect to the size of the absorption path during assembly.

Some other previous techniques attempt to take advantage of photoacoustic sensors assembled with surface mountable devices (SMDs) (e.g., surface mountable control components, power components, emitter components, detector components, and/or the like) can be mounted to a substrate (e.g., a printed circuit board (PCB)) to assemble the photoacoustic sensor. However, such previous techniques do not permit a photoacoustic sensor with a directionally arranged configuration to be assembled using a standard surface mount assembly process (e.g., a "pick-and-place" process). For example, in some instances, the emitter component and the detector component are mounted to separate substrates, which are then directionally arranged, which adds additional steps to the process and/or requires complex assembly (e.g., using brackets or connections between the substrates) and/or manual assembly to combine the separate substrates. In other cases, customized substrates for a photoacoustic sensor are configured to assemble photoacoustic sensors, a complex process that involves designing and creating the customized substrates and/or setting up or building custom configurations of machines (e.g., custom surface mount technology (SMT) machines) to mount the components to the customized substrate. Accordingly, such previous techniques are costly, time consuming, inflexible, and may require manual assembly, which can subject assembly of the photoacoustic sensor to human error.

Some implementations described herein provide an interconnect module for a modular photoacoustic sensor to permit the modular photoacoustic sensor to be assembled using a standard surface mount assembly process. The interconnect module may be configured to be situated between an emitter module that includes an emitter component and a detector module that includes a detector component. In some implementations, the interconnect module provides a sensor cavity to permit a gas to enter the sensor cavity (e.g., gas flow) and be sensed by the photoacoustic sensor, as described herein. Further, the interconnect module may include one or more conductive elements to enable an electrical connection between the emitter component and the detector component. Accordingly, the interconnect module may be configured as an SMD, such that the interconnect module can be situated between the detector module and the emitter module by one or more SMT machines, thus conserving time, costs, and resources (e.g., computing and manufacturing resources) that would otherwise be expended designing customized processes and/or setting up machines according to previous techniques. Furthermore, some implementations described herein enable several different stages of a process for assembling a photoacoustic sensor to be automated, reducing human subjectivity and waste, improving speed and efficiency, and conserving computing resources (e.g., processor resources, memory resources, and/or the like) associated with designing one or more processes according to previous techniques.

Figure 1:
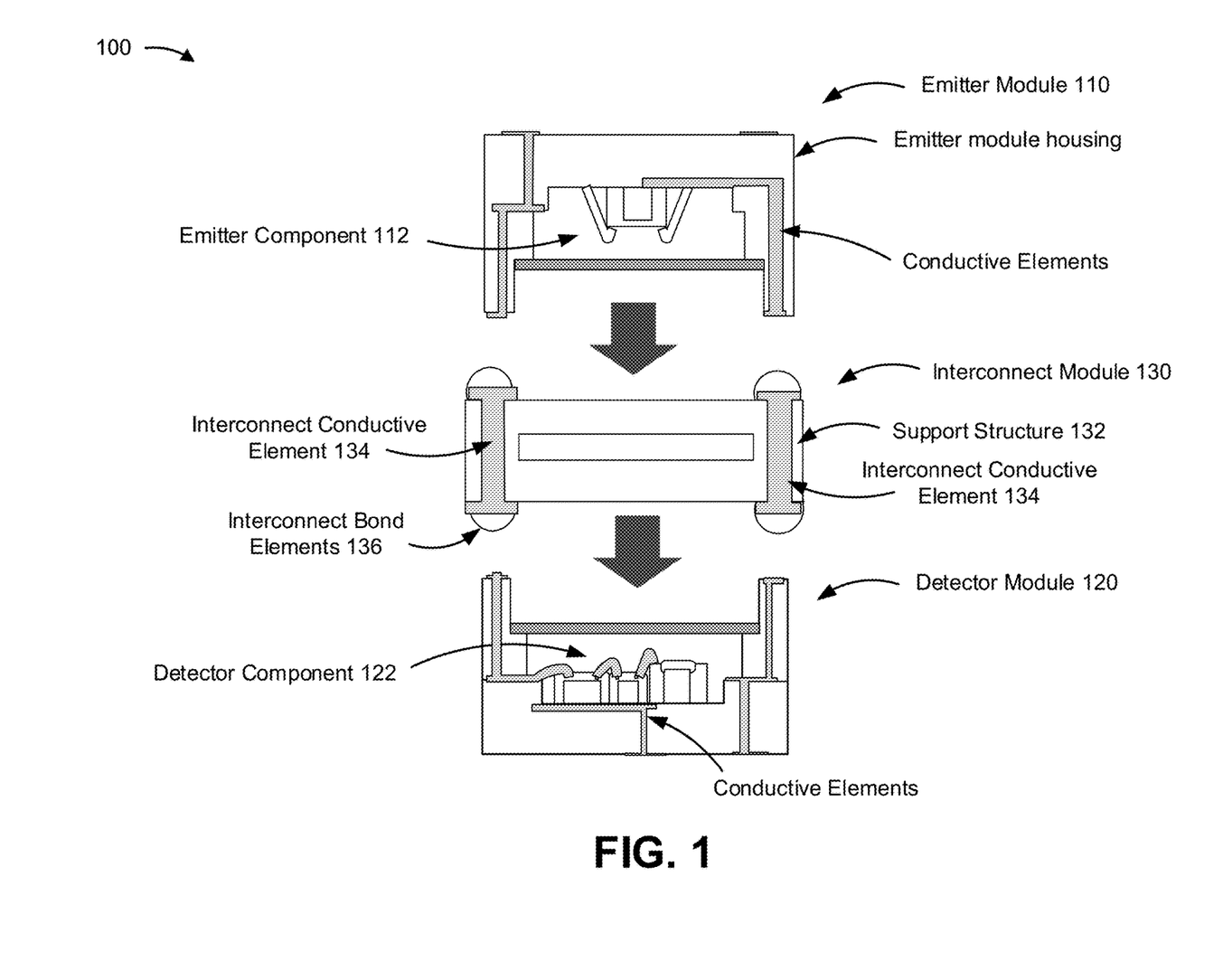
FIG. 1 is a diagram of an example implementation described herein.

FIG. 1 is a diagram of an example implementation described herein. As shown in FIG. 1, example implementation 100 includes an emitter module 110 that includes an emitter component 112, a detector module 120 that includes a detector component 122, and an interconnect module 130. Interconnect module 130 includes a support structure 132, one or more interconnect conductive elements 134 (which may be referred to herein collectively as "interconnect conductive elements 134" and individually as "interconnect conductive element 134"), and one or more interconnect bond elements 136 (which may be referred to herein collectively as "interconnect bond elements 136" and individually as "interconnect bond element 136"). As described herein, emitter module 110, detector module 120, and interconnect module 130 may be assembled (e.g., via an SMT machine) to form a photoacoustic module.

Emitter module 110, in example implementation 100, houses and/or holds emitter component 112. For example, emitter module 110 may include a housing (e.g., a non-conductive material, such as a ceramic material, a fiberglass epoxy resin material, and/or the like) for emitter component 112 and/or one or more conductive elements designed to establish an electrical connection to emitter component 112. In some implementations, the housing of emitter module 110 may be hermetically sealed (e.g., to enhance a reliability and/or lifespan of emitter component 112).

As further shown in FIG. 1, detector module 120 houses and/or holds detector component 122. For example, similar to emitter module 110, detector module 120 may include a housing for detector component 122 and/or one or more conductive elements designed to establish an electrical connection to detector component 122. The housing may be hermetically sealed using a non-conductive material, such as a ceramic material, a fiberglass epoxy resin material, and/or the like. In some implementations, detector module 120 may be configured to be mounted to a substrate (e.g., a PCB) and include a conductive through element to permit an electrical connection between emitter module 110, interconnect module 130, and detector module 120 to a conductive element of the substrate.

Interconnect module 130 includes a support structure 132. The support structure may be, for example, a fiberglass epoxy resin material and/or a ceramic material. As described herein, interconnect module 130, when attached to emitter module 110 and detector module 120, may form a cavity. The cavity may increase the size of an absorption path that receives a gas and/or enables the gas to flow between emitter module 110 and detector module 120. In some implementations, a height of interconnect module 130 (e.g., corresponding to a distance between emitter module 110 and detector module 120) and/or the volume of the cavity may be configured based on the type of gas or a particular gas (e.g., carbon dioxide ($CO_2$), methane, $NO_X$, an alcohol, and/or the like) that is to be sensed by the photoacoustic sensor of the photoacoustic module formed from emitter module 110, detector module 120, and interconnect module 130. For example, to more accurately detect certain gases and/or a composition of a gas, a relatively large cavity may be desired. In such cases, the height of interconnect module 130 may be relatively tall. On the other hand, for gases that may not need to be accurately detected and/or that may not require a large absorption path to be detected, the height of interconnect module 130 may be relatively short (e.g., to reduce a consumption of space of the photoacoustic sensor, to reduce material required, etc.).

In FIG. 1, a cross-sectional view of support structure 132 shows that support structure 132 includes interconnect conductive elements 134 extending through support structure 132 to permit an electrical connection to run through support structure 132. In such cases, the interconnect conductive elements 134 may be considered vias of interconnect module 130. In some implementations, the interconnect conductive elements 134 extend around an exterior of support structure 132. In such cases, support structure 132 may be a ceramic material to maintain and/or enhance a structural soundness of such a ceramic support structure 132.

As further shown in FIG. 1, interconnect module 130 may be attached (e.g., bonded, connected, adhered, and/or the like) to detector module 120, and emitter module 110 may be attached to interconnect module 130 on a side opposite detector module 120. For example, interconnect bond elements 136 (e.g., solder balls connected to ends of interconnect conductive elements 134), of interconnect module 130 may be soldered and/or sintered to conductive elements of detector module 120 and conductive elements of emitter module 110. Once attached, interconnect bond elements 136 may establish one or more electrical connections with interconnect conductive elements 134. For example, a first end of an interconnect conductive element 134 may be bonded to emitter module 110 and a second end of interconnect conductive element 134 may be bonded to detector module 120. Accordingly, the interconnect conductive element 134 may cause interconnect module 130 to be attached to emitter module 110 and detector module 120. In some implementations, interconnect conductive element 134 may form an electrical connection between emitter component 112 and detector component 122. Additionally, or alternatively, one or more interconnect conductive elements 134 may form an electrical connection between emitter component 112 and a control component and/or between detector component 122 and the control component.

As indicated above, FIG. 1 is provided merely as an example. Other examples may differ from what is described with regard to FIG. 1.

Figure 2:
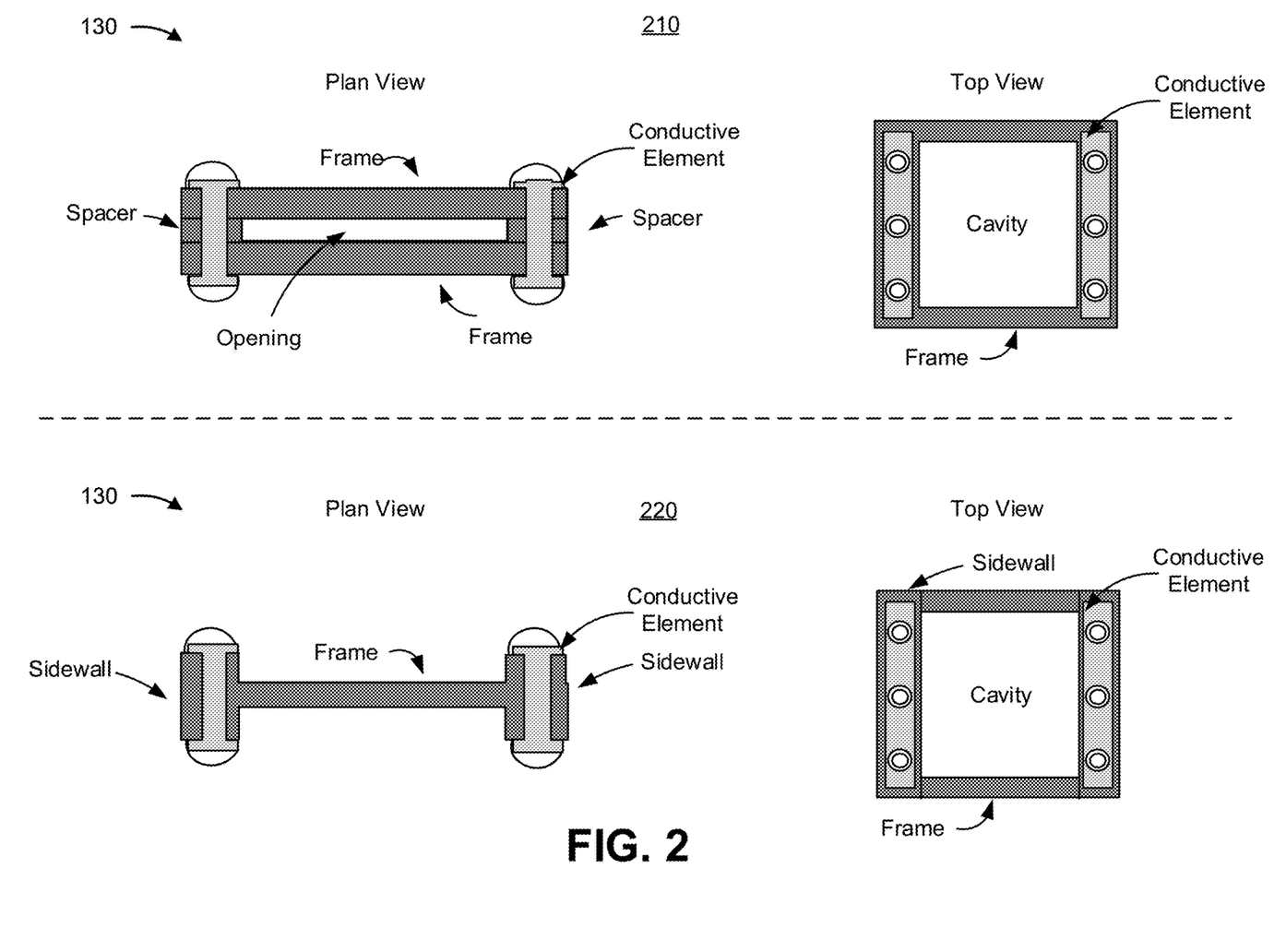
FIGS. 2-3 illustrate example implementations of an interconnect module described herein.

FIG. 2 illustrates example implementations of an interconnect module 130 associated with the example implementation of FIG. 1. In FIG. 2, the support structures of the example implementations of interconnect module 130 may be a fiberglass epoxy resin material (e.g. the same material as a PCB).

As shown in FIG. 2, and by reference number 210, interconnect module 130 may include a support structure (e.g., corresponding to support structure 132 of FIG. 1) with two frames and two spacers between the two frames. As shown in the top view, the frame may be rectangular in shape. The spacers may be lined along opposite sides of the frames. The spacers may be lined along the sides of the support structure that include one or more conductive elements, such as vias, of interconnect module 130. As shown in FIG. 2, the frames may be layers of material that are separate from the spacers. In some implementations, the frames and spacers may be formed from one solid piece of material to form the support structure of interconnect module 130.

In some implementations, a first one of the frames may be configured to be attached to an emitter module (e.g., emitter module 110) and a second one of the frames may be configured to be attached to a detector module (e.g., detector module 120). Accordingly, with the spacers situated between the first frame and the second frame, the spacers may form an opening between the first frame and the second frame. The opening may permit gas to enter and/or flow between the frames and into a cavity formed by the support structure of interconnect module 130.

As shown in FIG. 2, and by reference number 220, interconnect module 130 may include a support structure (e.g., corresponding to support structure 132 of FIG. 1) with one frame and two sidewalls. As shown in the top view, the frame may be rectangular in shape. The sidewalls may be lined along opposite sides of the frame. For example, the sidewalls may be aligned along the sides of the support structure that include one or more conductive elements of interconnect module 130. As shown in FIG. 2, two sides of the frame may be considered part of the sidewalls, with the sidewalls extending from either side of the frame. Additionally, or alternatively, a sidewall may be formed from spacers (e.g., spacers formed separately and/or from a separate piece of material than the frame) attached above and below a respective side of the frame.

In some implementations, a first one of the sidewalls may be configured to be attached to an emitter module (e.g., emitter module 110) and a detector module (e.g., detector module 120) and a second one of the sidewalls may be configured to be attached to the emitter module and the detector module. Accordingly, with the frame configured to be connected to the sidewalls, the frame may form one or more openings between the sidewalls. The one or more openings may permit gas to enter and/or flow between the sidewalls and into a cavity formed by the support structure of interconnect module 130.

In this way, interconnect module 130 may be configured to include one or more conductive elements to run through interconnect module 130, while increasing an absorption path (formed from the openings and cavities of the support structure of interconnect module 130) to enable a photoacoustic sensor to sense one or more gases. In some implementations, interconnect module 130 is formed from a material that is a different material than emitter module 110 or detector module 120.

As indicated above, FIG. 2 is provided merely as an example. Other examples may differ from what is described with regard to FIG. 2.

Figure 3:
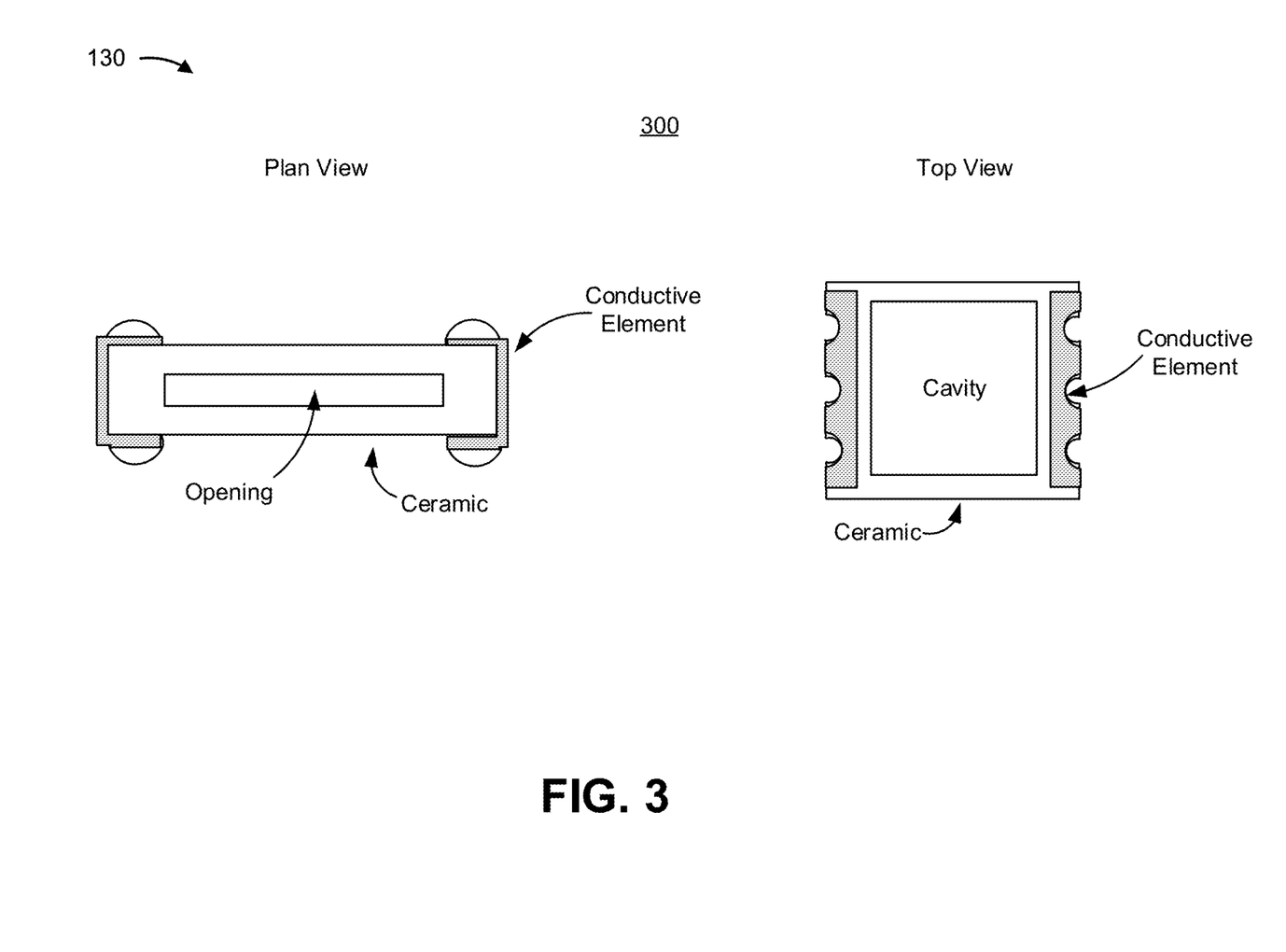

FIG. 3 is a top view of an example implementation of an interconnect module 130 that may be included within the example implementation of FIG. 1. In FIG. 3, a support structure of the example implementation 300 may be a ceramic material (e.g., a same material as emitter module 110 and/or detector module 120).

The interconnect module 130 of FIG. 3 includes a similar support structure as the example implementation of interconnect module 130 described in connection with reference number 210 in FIG. 2. Accordingly, a ceramic interconnect module 130 may enable an absorption path to be formed between an emitter module (e.g., emitter module 110) and a detector module (e.g., detector module 120).

To permit the ceramic interconnect module 130 of FIG. 3 to be attached to an emitter module and a detector module and provide an electrical connection between the emitter module and the detector module, the conductive element is arranged along an edge of a sidewall of interconnect module 130 of FIG. 3. Accordingly, the support structure of interconnect module 130 of FIG. 3 is strengthened by not having holes for the conductive elements extend through the support structure.

In this way, interconnect module 130 may be configured to provide a larger absorption path (formed from the openings and cavities of the example implementations of FIGS. 2-3), relative to an emitter module and a detector module being attached directly to one another, by increasing the distance between the emitter module (e.g., emitter module 110) and the detector module (e.g., detector module 120).

As indicated above, FIG. 3 is provided merely as an example. Other examples may differ from what is described with regard to FIG. 3.

Figure 4:
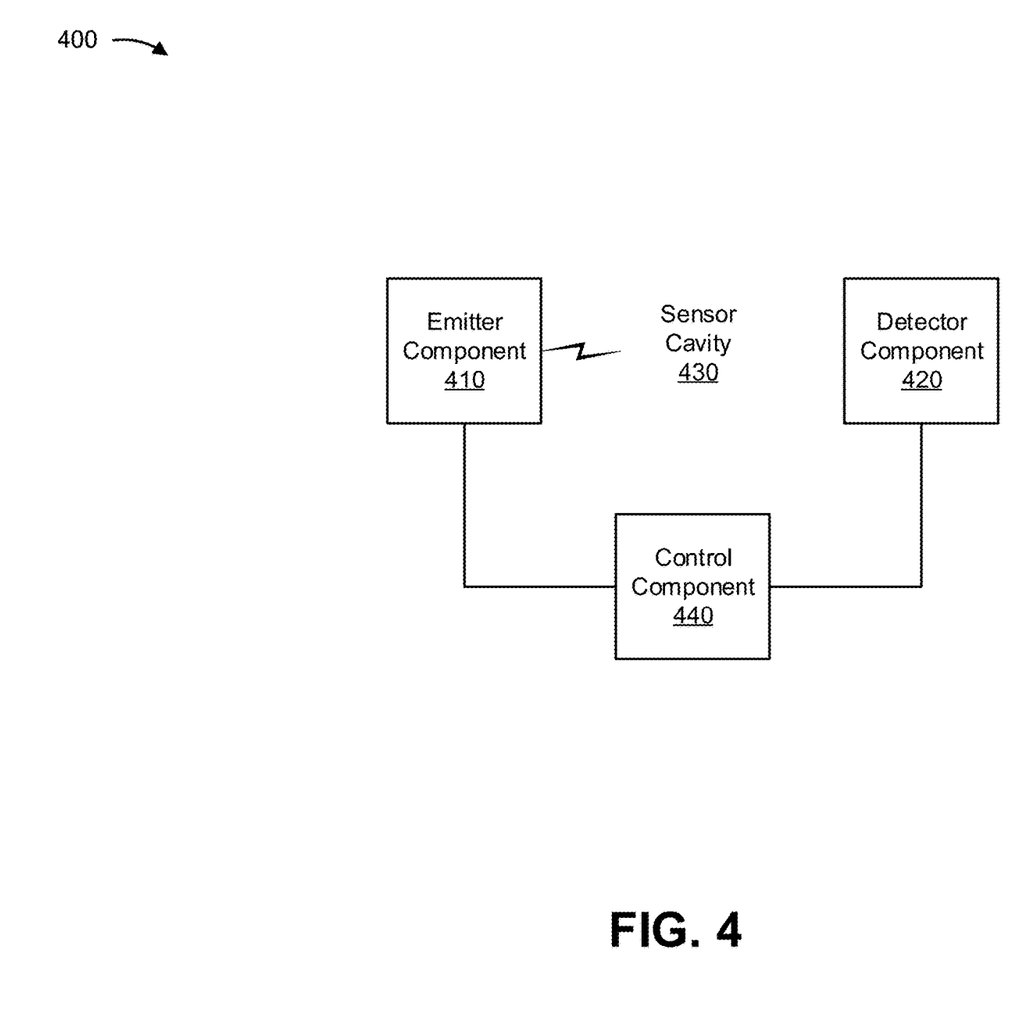
FIG. 4 is a diagram of example components of a sensor described herein.

FIG. 4 is a diagram of example components of a sensor 400 described herein. As shown in FIG. 4, sensor 400 may include an emitter component 410, a detector component 420, a sensor cavity 430, and a control component 440. Sensor 400 may include one or more of the modules described in connection with FIGS. 1-3.

Emitter component 410 may include one or more components, elements, materials, and/or the like to emit a light pulse. For example, emitter component 410 may be a light emitting diode (LED), a laser diode, and/or the like. Emitter component 410 may be housed and/or configured within an emitter module (e.g., emitter module 110). In some implementations, emitter component 410 may be hermetically sealed within a housing of the emitter module.

Emitter component 410 may emit light pulses that are to be absorbed by a gas in sensor cavity 430. Emitter component 410 may modulate the light pulses (based on a control signal from control component 440) so that particular targeted gas molecules absorb the light pulses to produce an acoustic signal that may be sensed by detector component 420. Emitter component 410 may correspond to emitter component 112 of FIG. 1.

Detector component 420 may include one or more components, elements, materials, and/or the like to sense a light pulse, from emitter component 410, being absorbed in sensor cavity 430. For example, detector component 420 may include a microphone capable of detecting an acoustic signal produced by gas, in sensor cavity 430, absorbing a light pulse. Detector component 420 may be housed and/or configured within a detector module (e.g., detector module 120). In some implementations, detector component 420 may be hermetically sealed within a housing of the detector module. Detector component 420 may correspond to detector component 122 of FIG. 1.

Sensor cavity 430 may include a volume, space, and/or the like between emitter component 410 and detector component 420. Sensor cavity 430 may be formed by way of an interconnect module 130 as described herein. In some implementations, a dimension of sensor cavity 430 (e.g., a distance between emitter component 410 and detector component 420) may be configured based on the type of gas that is to be sensed by sensor 400. In other words, one or more dimensions (e.g., length, width, and/or height) of sensor cavity 430 may be configured based the type of gas that is to be used to absorb light emitted by emitter component 410 and detected by detector component 420. Furthermore, the dimension of the sensor cavity 430 may correspond to a dimension of an interconnect module (e.g., interconnect module 130).

Control component 440 is implemented in hardware, firmware, and/or a combination of hardware and software. Control component 440 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, control component 440 includes one or more processors capable of being programmed to perform a function.

In some implementations, control component 440 may include one or more other components, such as a power component that drives emitter component 410, one or more passive components (e.g., resistors, capacitors, inductors, transformers, diodes, and/or the like), one or more other sensors (e.g., a pressure sensor, a humidity sensor, and/or the like), one or more other or sensor components, and/or the like. In some implementations, control component 440 includes a memory element (e.g., a read only memory (ROM) (e.g., an EEPROM), a random access memory (RAM), a flash memory, a magnetic memory, an optical memory, and/or the like) that stores information and/or instructions for use by sensor 400. The memory element may store information associated with processing performed by control component 440. Additionally, or alternatively, the memory element may store configurational values and/or parameters for emitter component 410 and/or detector component 420.

The number and arrangement of components shown in FIG. 4 are provided as an example. In practice, sensor 400 may include additional components, fewer components, different components, or differently arranged components than those shown in FIG. 4. Additionally, or alternatively, a set of components (e.g., one or more components) of sensor 400 may perform one or more functions described as being performed by another set of components of sensor 400.

Figure 5:
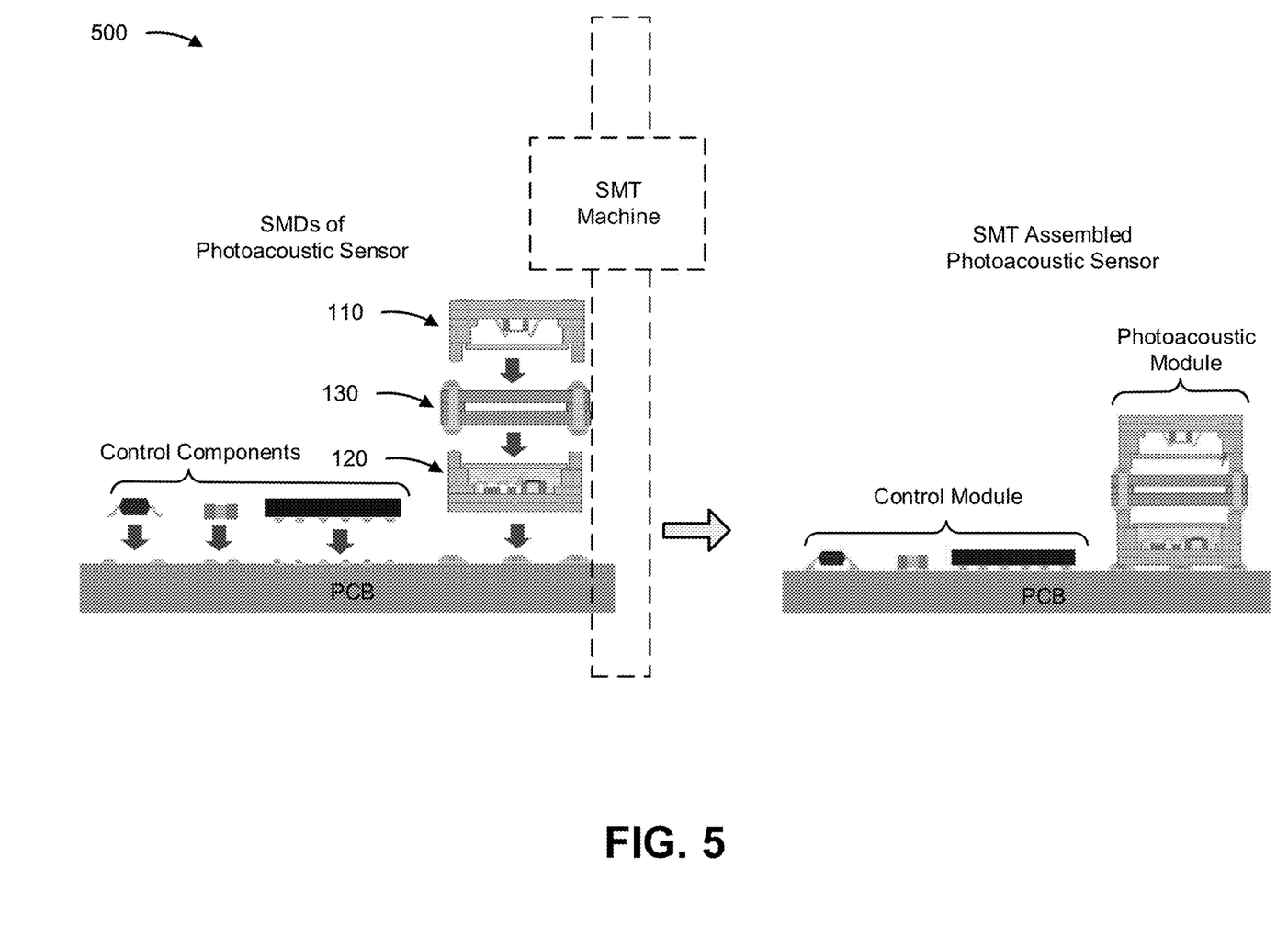
FIG. 5 is a diagram of an implementation of an assembly of a photoacoustic sensor described herein.

FIG. 5 is a diagram of an assembly of a modular photoacoustic sensor described herein. As shown in FIG. 5, an SMT machine assembles a photoacoustic sensor by situating and/or attaching SMDs of the photoacoustic sensor onto a substrate and/or onto one or more other SMDs. The SMDs may include emitter module 110, detector module 120, interconnect module 130, and/or one or more control components. The control components may include one or more microprocessors, power components (e.g., a metal-oxide-semiconductor field-effect transistor (MOSFET), and/or the like), passive components, and/or the like.

As described herein, emitter module 110, detector module 120, and interconnect module 130 may be configured to be stacked using the SMT machine. For example, emitter module 110, detector module 120, interconnect module 130, and/or one or more other components of a photoacoustic sensor may be standard, mass-produced SMDs (e.g., for use in the photoacoustic sensor or other types of photoacoustic sensors). Furthermore, such SMDs of a photoacoustic sensor may be configured according to standard sizes, standard mounting configurations, standard electrical configurations, and/or the like. Accordingly, the SMT machine may be configured to perform a pick-and-place process by picking, for each photoacoustic sensor, an emitter module 110, a detector module 120, and an interconnect module 130 (and any other components) and placing each picked emitter module 110, detector module 120, and interconnect module 130 appropriately within each photoacoustic sensor.

In some implementations, in example implementation 500, detector module 120 may first be mounted to a PCB by the SMT machine. Then, the SMT machine may mount interconnect module 130 to detector module 120. Then, the SMT machine may mount emitter module 110 to interconnect module 130. Accordingly, the SMT machine may assemble emitter module 110, detector module 120, and interconnect module 130 as a photoacoustic module of a photoacoustic sensor. Furthermore, the SMT machine may mount the control components to the PCB to complete the assembly of the photoacoustic sensor. Accordingly, as shown, the SMT assembled photoacoustic sensor may include a photoacoustic module (e.g., including emitter module 110, detector module 120, interconnect module 130) and a control module (e.g., including the control components) mounted to the PCB.

In the example of FIG. 5, the PCB may provide electrical connections between the control module and the photoacoustic module. For example, the PCB may provide an electrical connection between a control component of the control module and an emitter component (e.g., emitter component 112) of emitter module 110, and/or an electrical connection between the control component of the control module and a detector component (e.g., detector component 122) of detector module 120. Furthermore, interconnect module 130 may provide an electrical connection from the emitter component of emitter module 110 to the detector component of detector module 120 and/or from the emitter component of emitter module 110 to the control component (e.g., via detector module 120 and the PCB).

In some implementations, the SMT machine may select one or more of the SMDs from one or more bins that are holding the SMDs. Accordingly, the SMT machine may have access to several bins and/or queues of interconnect modules 130, where each bin includes interconnect modules 130 of different sizes. As such, for a particular photoacoustic sensor that is to be configured to sense a particular gas (e.g., carbon dioxide ($CO_2$), methane, a nitrogen oxide ($NO_X$), an alcohol, and/or the like) and to be assembled by the SMT machine of FIG. 5, the SMT machine may be configured to select the appropriate interconnect module 130 for that particular gas (e.g., based on instructions received for assembling the photoacoustic sensor). The SMT machine may then pick an interconnect module 130 from the appropriate bin and/or queue and place the interconnect module 130 on a detector module 120 for the photoacoustic sensor. Therefore, the SMT machine may assemble a photoacoustic sensor for a specific gas without a need to reconfigure the SMT machine to that photoacoustic sensor (other than the SMT receiving an indication of which interconnect module 130 is to be used in the assembly of the photoacoustic sensor, which is done for all assemblies of devices by SMT machines).

As indicated above, FIG. 5 is provided merely as an example. Other examples may differ from what is described with regard to FIG. 5.

Figure 6:
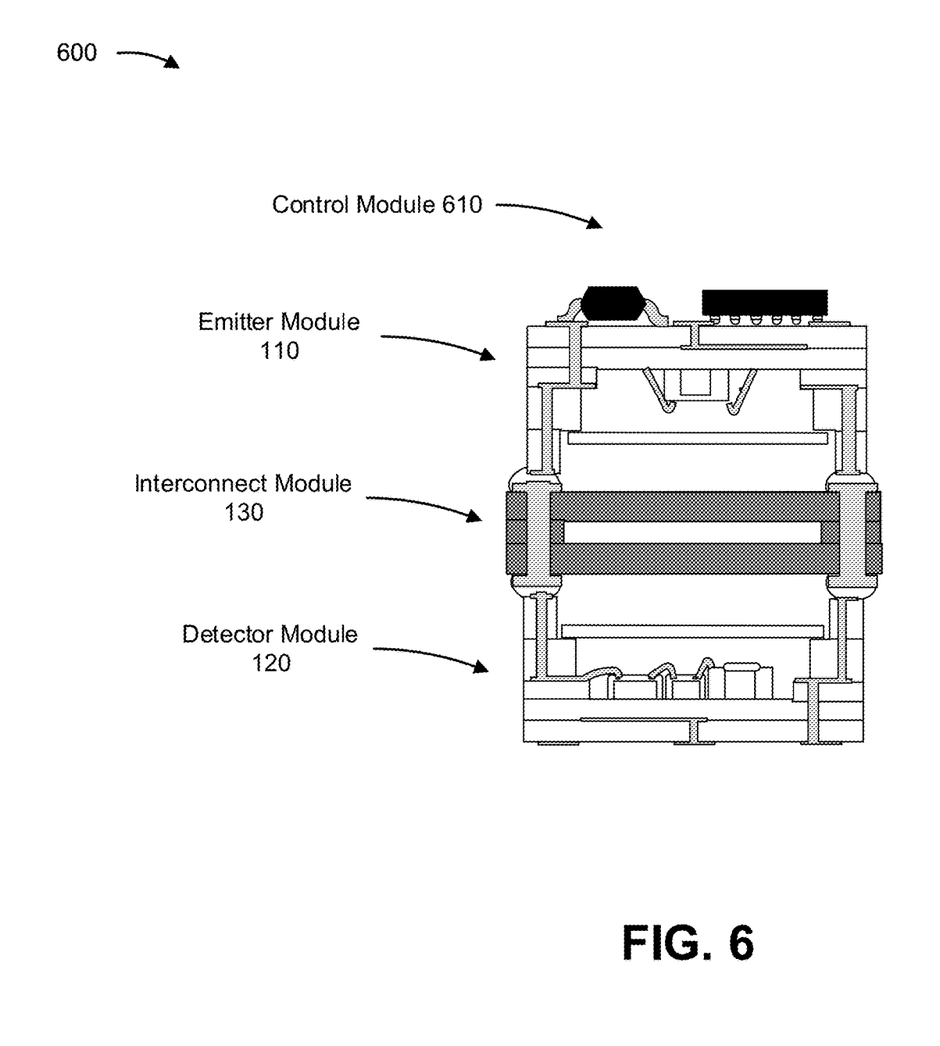
FIG. 6 is a diagram of an example implementation of a photoacoustic sensor described herein.

FIG. 6 is a diagram of an example implementation 600 of a photoacoustic sensor described herein. As shown in FIG. 6, the photoacoustic sensor includes emitter module 110, detector module 120, interconnect module 130, and a control module 610.

Control module 610 may include a control component (e.g., control component 440) to control an emitter component (e.g., emitter component 112) of emitter module 110 and/or a detector component (e.g., detector component 122). As shown in FIG. 6, control module 610 is mounted to emitter module 110. Accordingly, emitter module 110 may be configured to receive control module 610 via one or more conductive mounting surfaces. In some implementations, control module 610 may be mounted to emitter module 110 by an SMT machine (e.g., after detector module 120 is mounted to a PCB, after interconnect module 130 is mounted to detector module 120, and after emitter module 110 is mounted to interconnect module 130). Alternatively, or additionally, control module 610 may be mounted to interconnect module 130 and/or detector module 120.

As indicated above, FIG. 6 is provided merely as an example. Other examples may differ from what is described with regard to FIG. 6.

Figure 7:
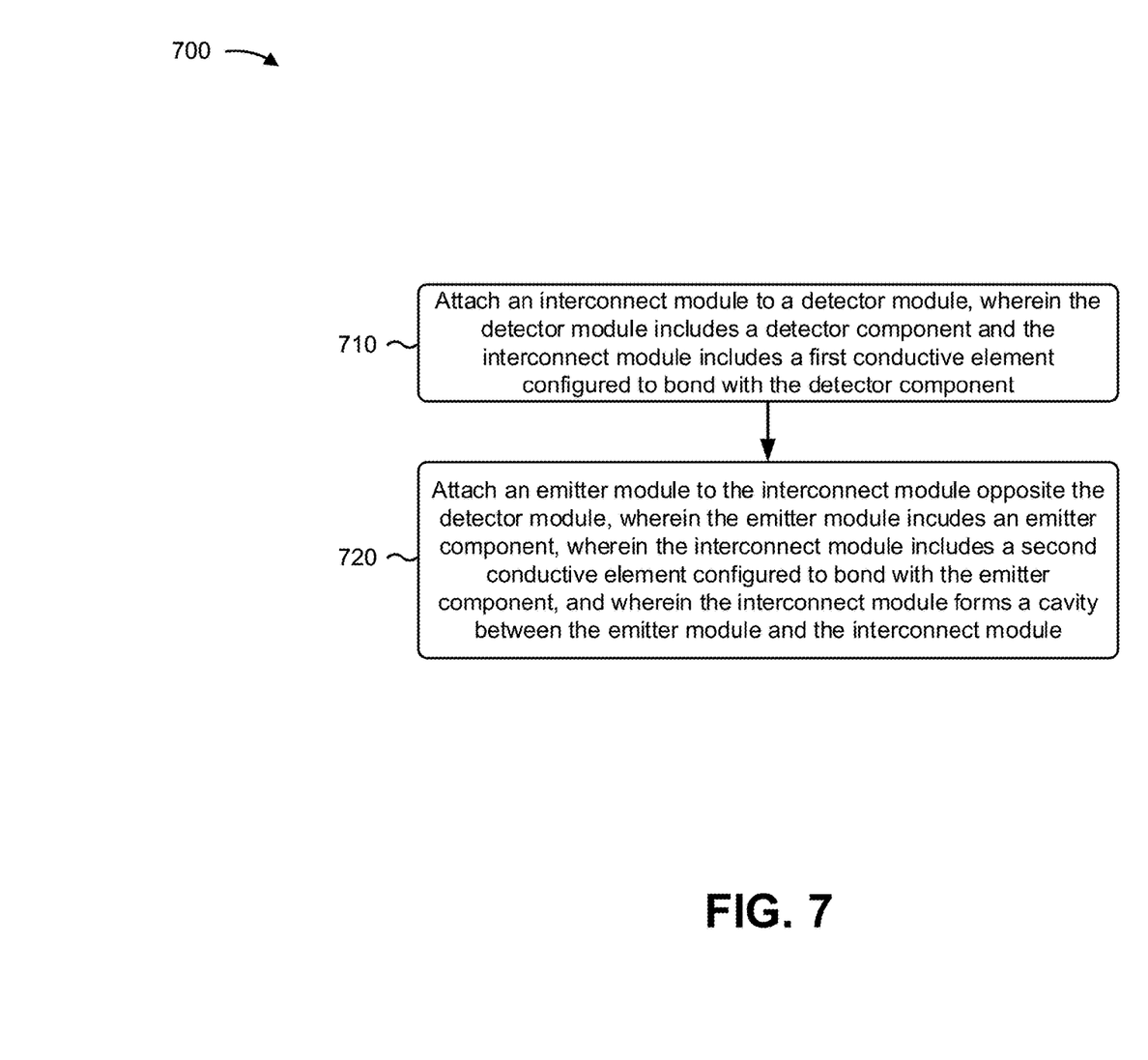
FIG. 7 is a flow chart of an example process associated with an assembly of a photoacoustic sensor.

FIG. 7 is a flow chart of an example process 700 associated with an assembly of a photoacoustic sensor. In some implementations, one or more process blocks of FIG. 7 may be performed by an SMT machine or any other similar device that is associated with and/or has access to one or more emitter modules 110, detector modules 120, interconnect modules 130, and/or the like, and the capability of assembling a photoacoustic sensor as described herein.

As shown in FIG. 7, process 700 may include attaching an interconnect module to a detector module, wherein the detector module includes a detector component and the interconnect module includes a first conductive element configured to bond with the detector component (block 710). For example, the SMT machine may attach an interconnect module to a detector module, as described above. In some implementations, the detector module includes a detector component and the interconnect module includes a first conductive element configured to bond with the detector component.

As further shown in FIG. 7, process 700 may include attaching an emitter module to the interconnect module opposite the detector module, wherein the emitter module includes an emitter component, wherein the interconnect module includes a second conductive element configured to bond with the emitter component, and wherein the interconnect module forms a cavity between the emitter module and the interconnect module (block 720). For example, the SMT machine may attach an emitter module to the interconnect module opposite the detector module, as described above. In some implementations, the emitter module includes an emitter component. In some implementations, the interconnect module includes a second conductive element configured to bond with the emitter component. In some implementations, the interconnect module forms a cavity between the emitter module and the interconnect module.

Process 700 may include additional implementations, such as any single implementation or any combination of implementations described below and/or in connection with one or more other processes described elsewhere herein.

In some implementations, the SMT machine may mount at least one of the emitter module, the detector module, or the interconnect module to a printed circuit board. In some implementations, the SMT machine may, before attaching the interconnect module to the detector module and before attaching the emitter module to the interconnect module, mount the detector module to a printed circuit board. In some implementations, the interconnect module is attached to the detector module after the detector module is mounted to the printed circuit board, and the emitter module is attached to the interconnect module after the detector module is mounted to the printed circuit board.

In some implementations, the first conductive element and the second conductive element are a same conductive element, are connected to a same conductive element, and/or corresponding ends of a conductive element. In some implementations, the SMT machine may assemble the emitter module, detector module, and interconnect module to form a photoacoustic module before attaching the photoacoustic module to the printed circuit board. In some implementations, the interconnect module may be preassembled with an emitter module and/or preassembled with a detector module before the SMT machine places the preassembled modules onto the printed circuit board.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the terms "component" and "module" are intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An interconnect module for a photoacoustic sensor, comprising:
   a support structure configured to be situated between an emitter module of the photoacoustic sensor and a detector module of the photoacoustic sensor,
      wherein the emitter module includes an emitter component and the detector module includes a detector component, and
      wherein the support structure, together with the emitter module and the detector module, form a cavity to receive a gas and to enable the gas to flow between the emitter module and the detector module; and
   a conductive element configured to connect to at least one of the emitter component or the detector component.

2. The interconnect module of claim 1, wherein the support structure is formed from at least one of:
   a fiberglass epoxy resin material; or
   a ceramic material.

3. The interconnect module of claim 1, wherein the conductive element corresponds to a via formed within the support structure.

4. The interconnect module of claim 1, wherein a first end of the conductive element is bonded to the emitter module and a second end of the conductive element is bonded to the detector module to cause the interconnect module to be connected to the emitter module and the detector module.

5. The interconnect module of claim 1, wherein the interconnect module is configured to permit the detector module to detect a composition of the gas in the cavity based on the gas absorbing one or more light pulses emitted from the emitter module.

6. The interconnect module of claim 1, wherein the support structure comprises:
   a first frame configured to attach to the emitter module,
   a second frame configured to attach to the detector module, and
   one or more spacers between the first frame and the second frame,
      wherein the one or more spacers are configured to form an opening between the first frame and the second frame.

7. The interconnect module of claim 1, wherein the support structure comprises:
   a first sidewall configured to attach to the emitter module and the detector module;
   a second sidewall configured to attach to the emitter module and the detector module; and
   one or more frames connected to the first sidewall and the second sidewall,
      wherein the one or more frames are configured to form an opening between the first sidewall and the second sidewall.

8. The interconnect module of claim 1, wherein the conductive element is configured to provide at least one of:
   an electrical connection between the emitter component and a control component of the photoacoustic sensor,
   an electrical connection between the detector component and the control component of the photoacoustic sensor, or
   an electrical connection between the emitter component and the detector component.

9. The interconnect module of claim 1, wherein the interconnect module is configured to be situated between the emitter module and the detector module by a surface mount technology (SMT) machine.

10. A photoacoustic sensor comprising:
    an emitter module,
       wherein the emitter module includes an emitter component configured to emit light pulses;
    a detector module,
       wherein the detector module includes a detector component configured to detect absorption of the light pulses by a gas; and
    an interconnect module positioned between the emitter module and the detector module,
       wherein the interconnect module comprises:
          a support structure connecting the emitter module and the detector module,
             wherein the support structure includes a conductive element to provide electrical connectivity to the emitter component or the detector component; and
             wherein the support structure includes a cavity to enable the gas to flow within the interconnect module.

11. The photoacoustic sensor of claim 10, wherein the interconnect module is formed from a different material than the emitter module, or the interconnect module is formed from a different material than the detector module.

12. The photoacoustic sensor of claim 10, wherein a dimension of the cavity is based on a type of the gas.

13. The photoacoustic sensor of claim 10, wherein the interconnect module, the emitter module, and the detector module are configured to be assembled as a photoacoustic module of the photoacoustic sensor using a surface mount technology (SMT) machine.

14. The photoacoustic sensor of claim 10, further comprising:
    a control module,
       wherein the control module includes a control component to control at least one of the emitter component or the detector component.

15. The photoacoustic sensor of claim 14, wherein the control module is mounted to at least one of:
    the emitter module,
    the detector module, or
    the interconnect module.

16. The photoacoustic sensor of claim 14, wherein the control module is mounted to a printed circuit board,
    wherein at least one of the emitter module, the detector module, or the interconnect module are mounted to the printed circuit board,
       wherein the printed circuit board provides at least one of:
          a first electrical connection between the control component and the emitter component, or
          a second electrical connection between the control component and the detector component.

17. The photoacoustic sensor of claim 16, wherein the conductive element provides at least one of:
    the first electrical connection, or
    the second electrical connection.

18. A method, comprising:
attaching an interconnect module to a detector module,
wherein the detector module includes a detector component and the interconnect module includes a first conductive element configured to bond with the detector component; and
attaching an emitter module to the interconnect module opposite the detector module,
wherein the emitter module incudes an emitter component,
wherein the interconnect module includes a second conductive element configured to bond with the emitter component, and
wherein a cavity, formed between the detector module, the emitter module, and the interconnect module, is to receive a gas and to enable the gas to flow between the emitter module and the detector module.

19. The method of claim 18, further comprising:
mounting at least one of the emitter module, the detector module, or the interconnect module to a printed circuit board.

20. The method of claim 18, further comprising:
mounting the detector module to a printed circuit board,
wherein the interconnect module is attached to the detector module after the detector module is mounted to the printed circuit board and the emitter module is attached to the interconnect module after the detector module is mounted to the printed circuit board.

* * * * *